(12) United States Patent
Schillo

(10) Patent No.: US 8,464,974 B2
(45) Date of Patent: Jun. 18, 2013

(54) DEVICE FOR APPLYING SHEET MATERIAL AND METHOD THEREOF

(76) Inventor: Sonny Schillo, Huntersville, NC (US)

( * ) Notice: Subject to any disclaimer, the term of this patent is extended or adjusted under 35 U.S.C. 154(b) by 940 days.

(21) Appl. No.: 12/556,011

(22) Filed: Sep. 9, 2009

(65) Prior Publication Data
US 2010/0059619 A1 Mar. 11, 2010

Related U.S. Application Data

(60) Provisional application No. 61/095,704, filed on Sep. 10, 2008.

(51) Int. Cl.
*B65H 16/02* (2006.01)
(52) U.S. Cl.
USPC ............................... 242/557; 242/403; 296/98
(58) Field of Classification Search
USPC ..................................... 242/403, 557; 296/98
See application file for complete search history.

(56) References Cited

U.S. PATENT DOCUMENTS

| | | | | |
|---|---|---|---|---|
| 495,156 A | * | 4/1893 | Howard | 242/403 |
| 667,788 A | * | 2/1901 | Murchison | 242/403 |
| 830,854 A | * | 9/1906 | Thompson | 242/403 |
| 2,536,571 A | * | 1/1951 | Sanguin et al. | 242/403 |
| 3,478,980 A | * | 11/1969 | Raasch | 242/403 |
| 5,205,605 A | * | 4/1993 | Haddad, Jr. | 296/98 |
| 5,803,391 A | * | 9/1998 | Saperstein et al. | 242/395 |
| 5,829,819 A | * | 11/1998 | Searfoss | 296/98 |
| 6,634,850 B2 | * | 10/2003 | Christensen | 414/607 |
| 6,811,202 B2 | * | 11/2004 | Hornady | 296/100.01 |
| 2012/0001010 A1 | * | 1/2012 | Payne | 242/598.5 |
| 2012/0187232 A1 | * | 7/2012 | Molen | 242/557 |

\* cited by examiner

*Primary Examiner* — William A Rivera
(74) *Attorney, Agent, or Firm* — L. C. Begin & Associates, PLLC

(57) ABSTRACT

A device, for applying a sheet material over objects, includes a frame member, at least one shaft member and a locking member. The frame member includes a base, a first sidewall and a second sidewall. The first sidewall and the second sidewall extend upwardly from the base. The at least one shaft member disposed between the first sidewall and the second sidewall such that a first end portion and a second end portion extend outwardly away from the first sidewall and the second sidewall, respectively. The at least one shaft member is rotated for wrapping the sheet material around the first end portion, and for unwrapping the sheet material from the first end portion over the objects. The locking member is disposed on the second end portion of each of the at least one shaft member for locking and unlocking rotation of the each of the at least one shaft member.

7 Claims, 5 Drawing Sheets

DEVICE FOR APPLYING SHEET MATERIAL AND METHOD THEREOF

CROSS-REFERENCE TO RELATED APPLICATIONS

The present disclosure claims priority under 35 United States Code, Section 119 on the U.S. Provisional Patent Application No. 61/095,704 filed on Sep. 10, 2008 the disclosure of which is incorporated by reference.

FIELD OF THE DISCLOSURE

The present disclosure generally relates to covering systems, and more particularly, to a device and method for applying a sheet material over objects, such as objects placed on transportation vehicles, trailers, and the like.

BACKGROUND OF THE DISCLOSURE

Transportation vehicles, trailers, and the like are used for transportation of a wide variety of objects (hereinafter referred to as "cargo"). Generally, a transportation vehicle includes a bed portion on which the cargo is placed for being transported. Such transportation of the cargo is performed in all seasons under varying environmental conditions. Under such varying environmental conditions, the cargo placed on the bed portion of the transportation vehicle gets affected by agents, such as debris on roads, rain, snow and other ambient agents. Further, there are chances that improperly placed articles of the cargo may fall out of the bed portion while transporting thereof. Therefore, the articles of the cargo are required to be protected from such agents, and from falling out of the transportation vehicle. To protect the articles of the cargo from such agents and from falling out of the transportation vehicle, a cover, such as a tarpaulin, is generally applied manually over the cargo.

In order to apply the cover manually over the cargo, workers have to climb on the transportation vehicle and subsequently move over the cargo placed on the bed portion of the transportation vehicle. Such climbing and moving of the worker may be dangerous and prone to accidents. Moreover, such climbing and moving of the workers for applying the cover over the cargo is a time consuming and inconvenient exercise.

Accordingly, there exists a need for safely covering cargos without a need of climbing and moving on and over transportation vehicles. Further, there exists a need for covering the cargo on the transportation vehicle in a rapid and convenient manner.

SUMMARY OF THE DISCLOSURE

In view of the foregoing disadvantages inherent in the prior art, the general purpose of the present disclosure is to provide a device for applying a cover, such as a sheet material, over objects, such as a cargo to include all advantages of the prior art, and to overcome the drawbacks inherent in the prior art.

An object of the present disclosure is to provide a device capable of safely covering the objects without a need of climbing and moving on and over transportation vehicles.

Another object of the present disclosure is to provide a device for covering the objects on the transportation vehicles in a rapid and convenient manner.

In light of the above objects, in an aspect of the present disclosure a device for applying a sheet material over objects is provided. The device includes a frame member, at least one shaft member and a locking member. The frame member includes a base, a first sidewall and a second sidewall. Each of the first sidewall and the second sidewall extends upwardly from the base in a spaced apart relation with each other. Further, the at least one shaft member includes a first end portion and a second end portion opposite to the first end portion. The at least one shaft member is rotatably disposed between the first sidewall and the second sidewall such that the first end portion and the second end portion extend outwardly from the first sidewall and the second sidewall, respectively. The at least one shaft member is capable of being rotated for wrapping the sheet material around the first end portion, and is also capable of being rotated for unwrapping the sheet material from the first end portion over the objects. Furthermore, the locking member is disposed on the second end portion of each of the at least one shaft member. The locking member is capable of locking and unlocking rotation of the each of the at least one shaft member.

In another aspect of the present disclosure, a method for applying a sheet material over objects is provided. For applying the sheet material over objects a device is obtained. The device comprises a frame member, at least one shaft member and a locking member. The frame member includes a base, a first sidewall and a second sidewall. Each of the first sidewall and the second sidewall extends upwardly from the base in a spaced apart relation with each other. The at least one shaft member includes a first end portion and a second end portion opposite to the first end portion. The at least one shaft member is rotatably disposed between the first sidewall and the second sidewall such that the first end portion and the second end portion extend outwardly from the first sidewall and the second sidewall, respectively. The at least one shaft member is capable of being rotated for wrapping the sheet material around and onto the first end portion, and is also capable of being rotated for unwrapping the sheet material from the first end portion over the objects. The locking member is disposed on the second end portion of each of the at least one shaft member. The locking member is capable of locking and unlocking rotation of the each of the at least one shaft member. Further, the sheet material is wrapped around and onto the first end portion of the at least one shaft member. Furthermore, the device is moved to a predetermined height. Thereafter, a free end of the sheet material wrapped around the first end portion of the at least one shaft member is dropped over the objects. Moreover, the device is moved for unwrapping the sheet material from the first end portion of the at least one shaft member over the objects for applying the sheet material over the objects for covering the objects.

The device, as disclosed herein, is capable of safely covering the objects placed on transportation vehicles without a need of climbing and moving of workers on the transportation vehicles. More specifically, the frame member is capable of being lifted and moved along a length of the transportation vehicle, and simultaneously the at least one shaft member and the locking member enable unwrapping of the sheet material over the objects for applying the sheet material over the objects, thereby eliminating the need of climbing and moving of the workers on the transportation vehicles for covering the objects. Furthermore, the device eliminates manual covering of the objects, thereby covering of the objects in a rapid and a convenient manner.

These together with the other aspects of the present disclosure, along with the various features of novelty that characterized the present disclosure, are pointed out with particularity in the claims annexed hereto and form a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The term "first," "second," "front," "rear," and the like, herein do not denote any order, elevation or importance, but rather are used to distinguish placement of one element over another. Further, the terms "a" and "an" herein do not denote a limitation of quantity, but rather denote the presence of at least one of the referenced item.

Figure 1:
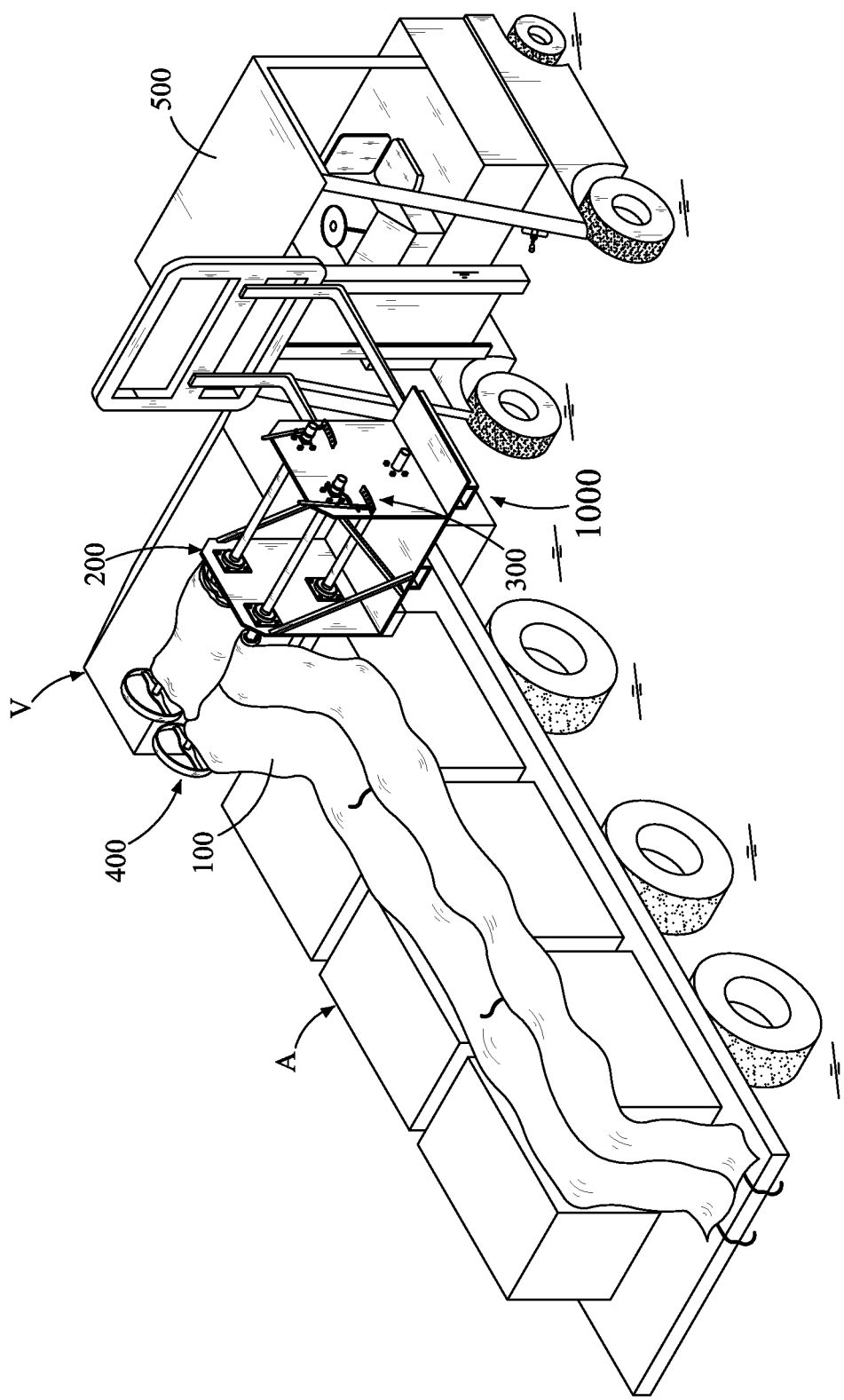
FIG. 1 illustrates a perspective view of an environment depicting a device for applying a sheet material (hereinafter referred to as "device") in a utilized state, in accordance with an embodiment of the present disclosure.

Referring now to FIG. 1, a perspective view of an environment depicting a device for applying a sheet material 1000 (herein after referred to as "device 1000") in a utilized state is illustrated, in accordance with an embodiment of the present disclosure. The device 1000 is utilized for applying a sheet material 100 over objects 'A'. The objects 'A' may include, but not limited to, cargo, freight, and the like, placed on a transportation vehicle 'V', that are to be covered employing the device 1000 using the sheet material 100. Further, the sheet material 100 may include, but not limited to, tarpaulin and the like. The device 1000 includes a frame member 200, at least one shaft member 400 and a locking member 300. According to one embodiment of the present disclosure, the at least one shaft member is shown to include two shaft members, such as a first shaft member 400a and a second shaft member 400b (see FIG. 2A, hereinafter also collectively referred to as "shaft members 400"). The shaft members 400 are rotatably coupled to the frame member 200 for laying the sheet material 100 over the objects 'A'. Furthermore, in the present embodiment, the locking member 300 is disposed on each of the at least one shaft member. More specifically, the locking member 300 is disposed on each of the first shaft member 400a and the second shaft member 400b for locking and unlocking rotation of each of the first shaft member 400a and the second shaft member 400b for laying the sheet material 100 over the objects 'A'.

As shown in FIG. 1, the frame member 200 is capable of being lifted at a predetermined height by a lifting device 500, and subsequently being moved along a length of the transportation vehicle 'V' by the lifting device 500 for unwrapping the sheet material 100 from the shaft members 400 over the objects 'A'. Specifically, the shaft members 400 are rotatably disposed for unwrapping the sheet material 100 from the shaft members 400 over the objects 'A'. Further, the locking member 300 on the respective shaft members 400 is capable of locking and unlocking rotation of the respective shaft members 400 for respectively, spreading and stop spreading the sheet material 100 from the respective shaft members 400 over the objects 'A'. The locking member 300 will be described in detail with reference to FIG. 3. Herein reference will be made to FIG. 2A and 2B for describing the frame member 200 and the shaft members 400.

Figure 2A:
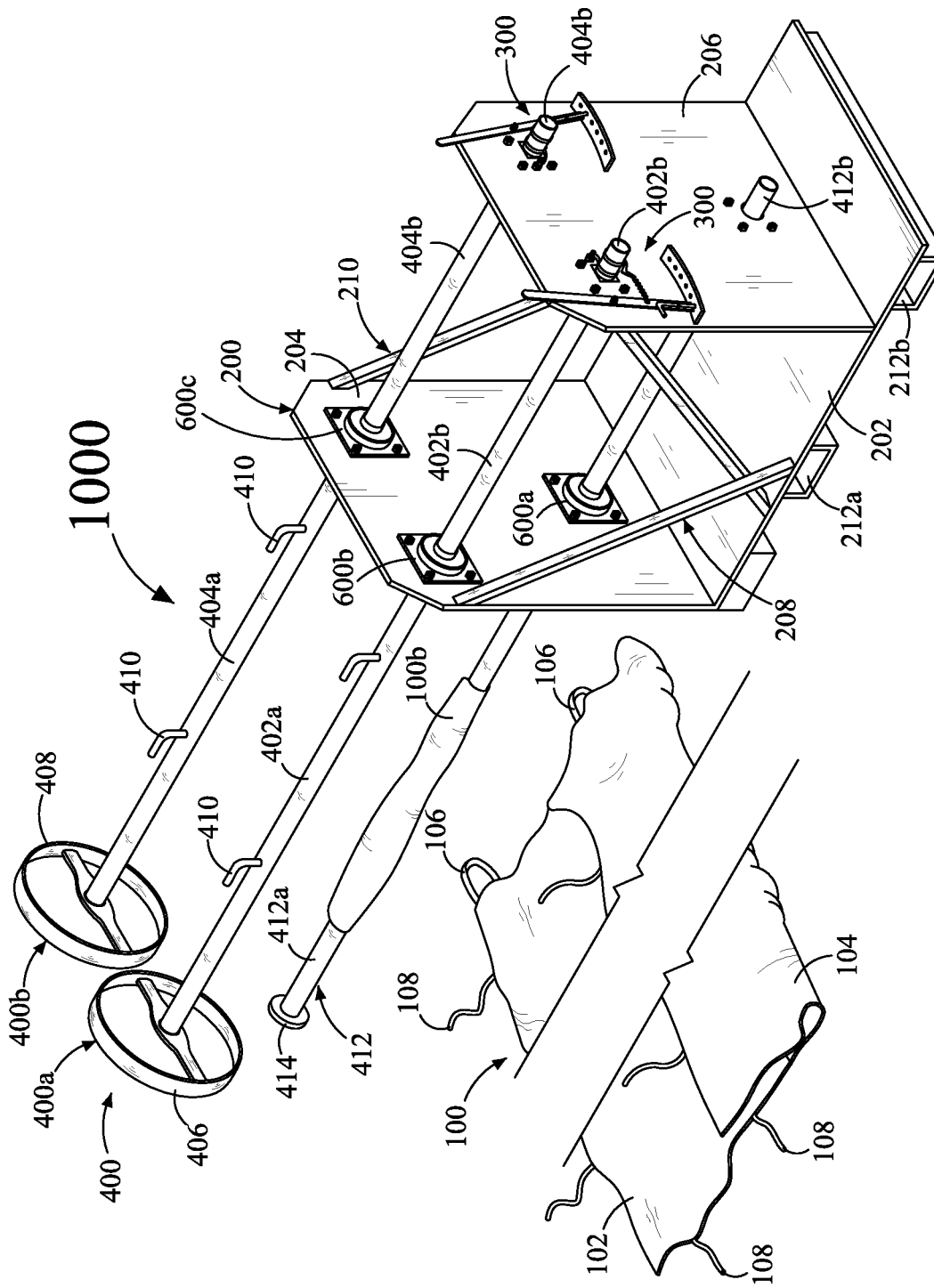
FIG. 2A illustrates a perspective view of the device having the unwrapped sheet material, in accordance with an embodiment of the present disclosure.
Figure 2B:
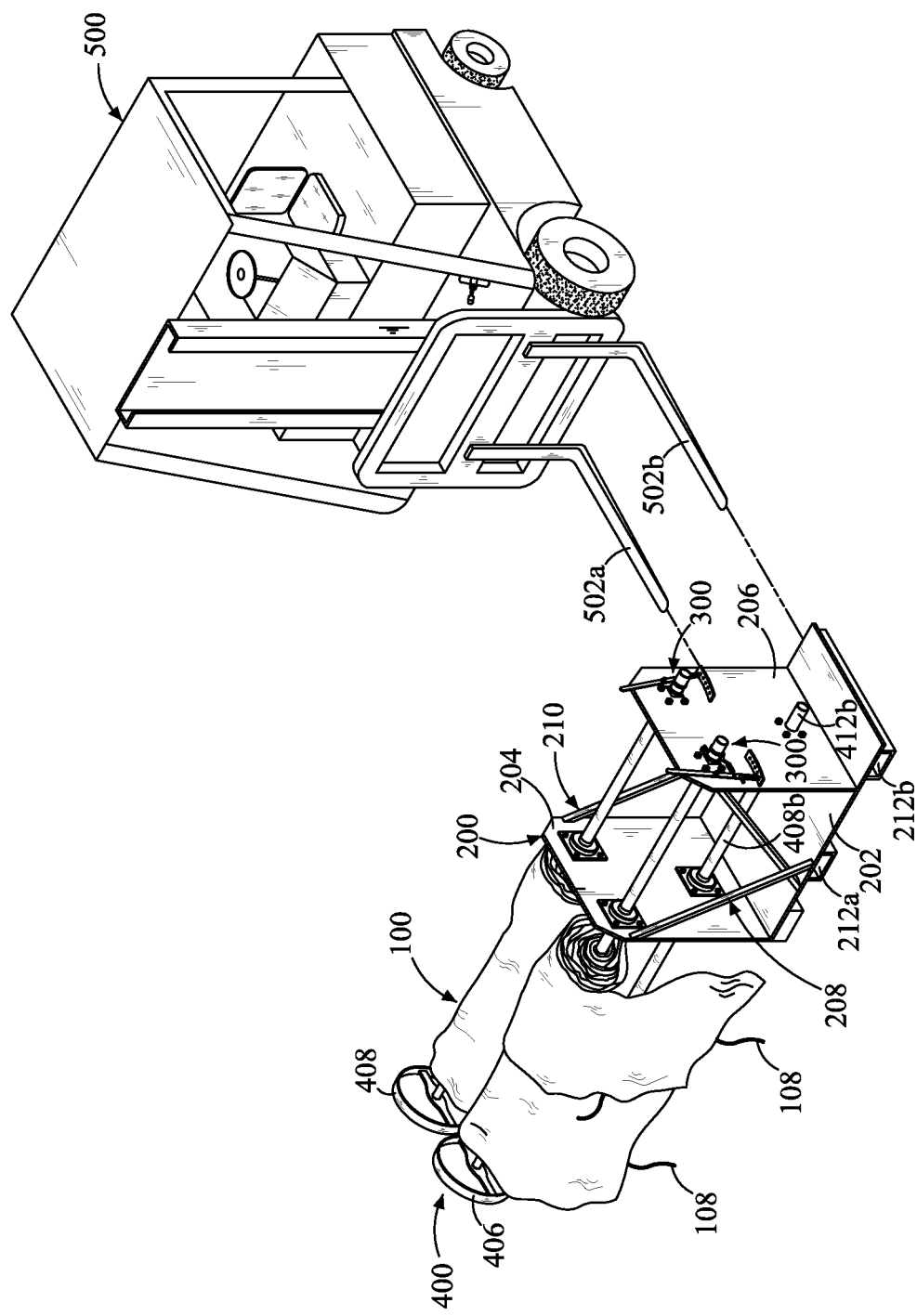
FIG. 2B illustrates a perspective view of the device having the wrapped sheet material, in accordance with an embodiment of the present disclosure.

FIGS. 2A and 2B illustrate a perspective view of the device 1000, in accordance with an embodiment of the present disclosure. More specifically, FIG. 2A illustrates a perspective view of the device 1000 having an unwrapped sheet material 100, and FIG. 2B illustrates a perspective view of the device 1000 having a wrapped sheet material 100. Herein FIGS. 2A and 2B will be described in conjunction with FIG. 1. The frame member 200 comprises a base 202, a first sidewall 204 and a second sidewall 206. The first sidewall 204 and the second sidewall 206 extend upwardly from the base 202 in a spaced apart relation from each other. Further, the frame member 200 includes at least one supporting member arranged between the first sidewall 204, the second sidewall 206 and the base 202. In one embodiment of the present disclosure, the at least one supporting member is shown to include a plurality of supporting members, such as a first set of supporting member 208 and a second set of supporting member 210. The first set of supporting member 208 and the second set of the supporting member 210 are disposed between the first sidewall 204, the second sidewall 206 and the base 202 to provide stability to the frame member 200. Furthermore, the frame member 200 includes at least one channel member. According to one embodiment of the present disclosure, the at least one channel member is shown to include two channel members, such as a first channel member 212a and a second channel member 212b. The first channel member 212a and the second channel member 212b are capable of receiving a portion of the lifting device 500 (shown in FIG. 1 & FIG. 2B) for lifting and moving the device 1000 for applying the sheet material 100 over the objects 'A'. More specifically, as shown in FIG. 2B, the first channel member 212a and the second channel member 212b of the frame member 200, respectively, receive a first fork 502a and a second fork 502b of the lifting device 500 for lifting and moving the device 1000 for applying the sheet material 100 over the objects 'A' from the shaft members 400.

As shown in FIGS. 2A and 2B, each of the shaft members 400, such as the first shaft member 400a and the second shaft member 400b, includes a first end portion and a second end portion. Specifically, the first shaft member 400a includes a first end portion 402a and a second end portion 402b. The first shaft member 400a is rotatably disposed between the first sidewall 204 and the second sidewall 206 of the frame member 200 such that the first end portions 402a and the second end portions 402b, extend outwardly away from the first sidewall 204 and the second sidewall 206 of the frame member 200, respectively. Similar to the first shaft member 400a, the second shaft member 400b also includes a first end portion 404a and a second end portion 404b, and is rotatably disposed between the first sidewall 204 and the second sidewall 206 of the frame member 200 in a similar manner as the first shaft member 400a is disposed. Each of the first shaft member 400a and the second shaft member 400b is capable of being rotated for wrapping the sheet material 100 around and onto the respective first end portions 402a and 404a thereof. Further, each of the first shaft member 400a and the second shaft member 400b is capable of being rotated for unwrapping the sheet material 100 from the respective first end portions 402a and 404a thereof over the objects 'A'. According to one embodiment of the present disclosure, each of the first shaft member 400a and the second shaft member 400b includes a steering handle. Specifically, the first shaft member 400a includes a steering handle 406 disposed at the free end of the first end portion 402a thereof. Similarly, the second shaft member 400b includes a steering handle 408 disposed at the free end of the first end portion 404a thereof. The steering handles 406 and 408 may be maneuvered clockwise and anticlockwise for respectively rotating the first shaft member 400a and the second shaft member 400b, to wrap and unwrap the sheet material 100 therefrom over the objects 'A'.

Moreover, in one embodiment of the present disclosure, each of the first shaft member 400a and the second shaft member 400b includes at least one attaching member, such as attaching members 410. The attaching members 410 enable attachment of the sheet material 100 on the first shaft member 400a and on the second shaft member 400b for wrapping the sheet material 100 over the respective first end portions 402a and 404a of the first shaft member 400a and the second shaft member 400b. More specifically according to one embodiment of the present disclosure, the sheet material 100 that may be attached to the attaching members 410, includes a planer portion 102, a foldable planer portion 104 capable of being folded and unfolded about the planer portion 102, and an attaching portion 106 attached to a periphery of the sheet material 100 for enabling attachment of the sheet material 100 with the device 1000. Specifically, the attaching portion 106 may be attached to the attaching members 410 of the first shaft member 400a. Accordingly, the first shaft member 400a may be rotated for wrapping the sheet material 100 over the first end portion 402a thereof. Similarly, a sheet material, such as the sheet material 100 may also be wrapped around the first end portion 404a of the second shaft member 400b. The wrapped sheet material 100 may be unwrapped for spreading over the objects 'A', and accordingly, the foldable planer portion 104 may be unfolded away from the planer portion 102 for completely covering the objects 'A'. Further, as shown in FIGS. 2A and 2B, the planer portion 102 and the foldable planer portion 104 include a plurality of strings, such as strings 108 extending from the periphery of the sheet material 100. The strings 108 are used for fastening and securing the sheet material 100 over the objects 'A'.

Furthermore, as shown in FIGS. 2A and 2B, according to one embodiment of the present disclosure, the device 1000 includes an auxiliary shaft member 412. The auxiliary shaft member 412, similar to the shaft members 400, includes a first end portion 412a and a second end portion 412b thereof, and is rotatably disposed between the first sidewall 204 and the second sidewall 206 of the frame member 200. For the sake of brevity, the auxiliary shaft member 412 is not described in great detail. The auxiliary shaft member 412 is capable of being rotated for wrapping an auxiliary sheet material 100b around the first end portion 412a thereof, which may, upon requirement, be unwrapped therefrom for for spreading over the objects 'A' to provide additional covering to the objects 'A'. Furthermore, the auxiliary shaft member 412 includes a stopper 414 disposed at the free end of the first end portion 412a thereof. The stopper 414 is capable of blocking the auxiliary sheet material 100b from slipping out from the first end portion 412a of the auxiliary shaft member 412. The auxiliary sheet material 100b may include, but not limited to, plastics and the like.

Moreover, each of the auxiliary shaft member 412 and the shaft members 400 includes a collar. Specifically, the auxiliary shaft member 412 has a collar 600a, the first shaft member 400a has a collar 600b, and the second shaft member 400b has a collar 600c. Hereinafter, the collars 600a, 660b and 600c will be collectively referred to as collars 600. The collars 600 are capable of supporting the auxiliary shaft member 412 and the shaft members 400 on the first sidewall 204 and the second sidewall 206 of the frame member 200 to provide stability thereto during wrapping and unwrapping of the auxiliary sheet material 100b and the sheet material 100 therefrom, respectively. Wrapping and unwrapping of the sheet material 100 may be controlled by the locking member 300.

Figure 3:
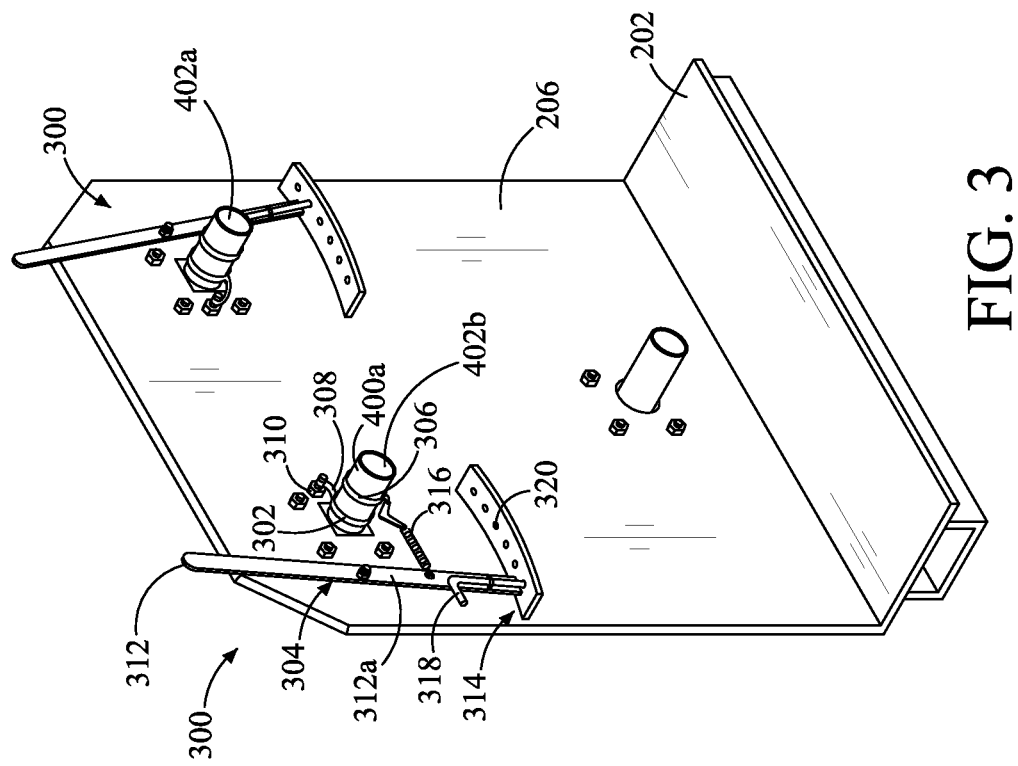
FIG. 3 illustrates an enlarged view of a locking member of the device, in accordance with an embodiment of the present disclosure.

Referring now to FIG. 3, a perspective view of the locking member 300 of the device 1000 for applying the sheet material 100, in accordance with an embodiment of the present disclosure. Herein reference of previous figures will be made to describe the FIG. 3. It should be evident to those skilled in the art that a separate locking member, such as the locking member 300 is disposed on each of the first shaft member 400a and the second shaft member 400b. The locking member 300 is disposed on the second end portions 402b and 404b of the first shaft member 400a and the second shaft member 400b, respectively, and supported on the second sidewall 206 of the frame member 200 for applying resistance to the rotation of the first shaft member 400a and the second shaft member 400b.

According to one embodiment of the present disclosure, the locking member 300 includes a band member 302 and a lever assembly 304. The band member 302 includes a first end 306 and a second end 308 opposite to the first end 306. The band member 302 encircles the second end portion 402b of the first shaft member 400a; similarly, the band member 302 encircles the second end portion 404b of the second shaft member 400b. Further, the lever assembly 304 is connected to the first end 306 of the band member 302. Furthermore, the second end 308 of the band member 302 is connected to the second sidewall 206 of the frame member 200 via a fastener 310. The lever assembly 304 is capable of being locked at various positions for enabling the band member 302 for locking the rotation of the shaft members 400 during wrapping and unwrapping of the sheet material 100 over the objects 'A'.

In an embodiment of the present disclosure, the lever assembly 304 includes a lever 312, a latch mechanism 314 and a spring 316. The lever 312 is pivotally connected to the second side wall 206, and a bottom portion 312a thereof is interlocked with the latch mechanism 314. The latch mechanism 314 includes a rod 318 disposed at the bottom portion 312a of the lever 312, and a plurality of slots 320. The rod 318 is capable of being slid for being partially received in one slot at a time of the plurality of slots 320 for locking the lever assembly 304. Further, the spring 316 enables coupling of the lever assembly with the band member 302 for applying force on the band member 302, which in turn restricts or eases rotation of the first shaft member 400a and the second shaft member 400b, when the sheet material 100 is applied over the objects 'A'.

Figure 4:
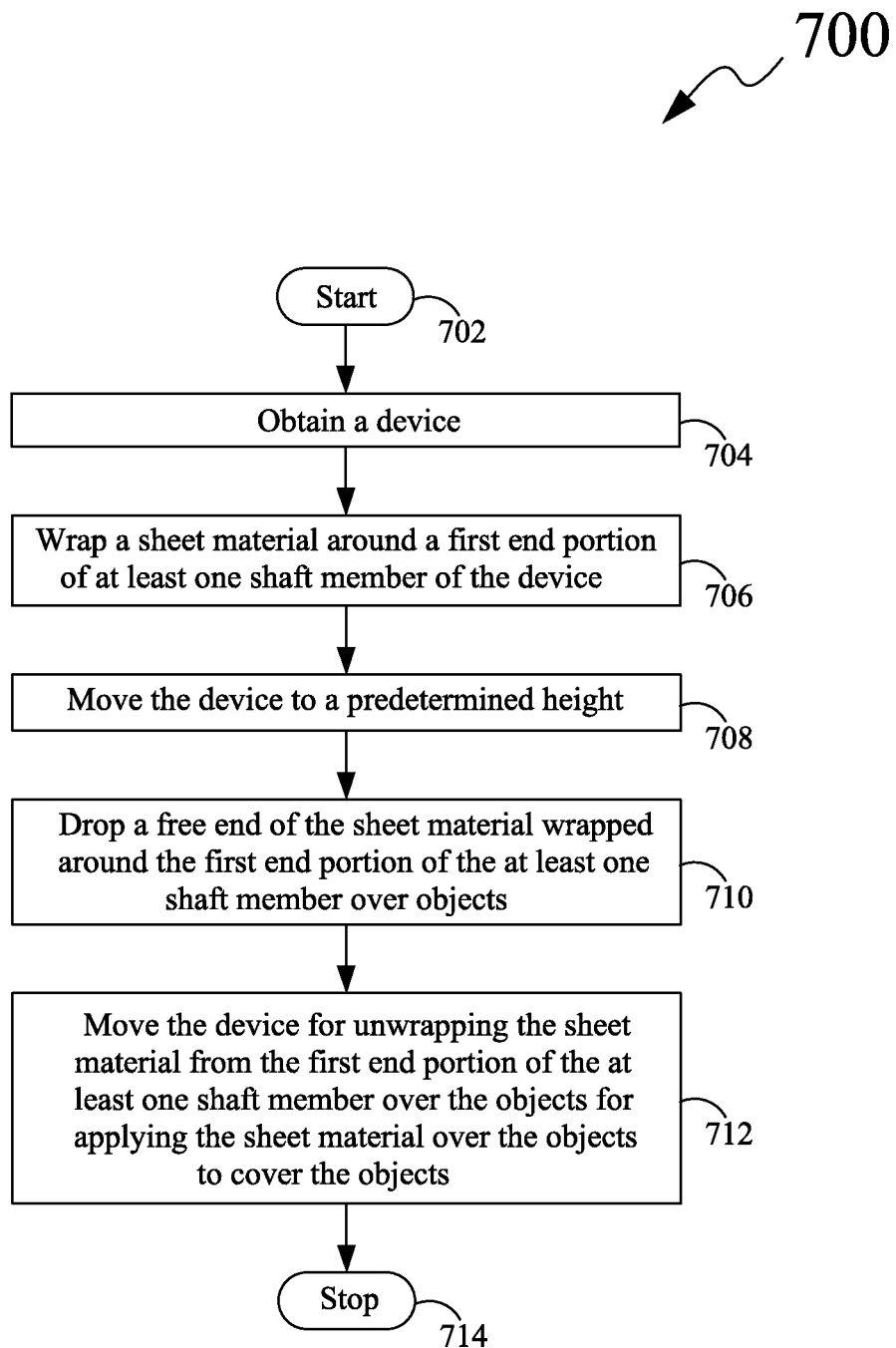
FIG. 4 illustrates a flow diagram of a method for using the device for applying the sheet material, in accordance with an embodiment of the present disclosure.

Referring now to FIG. 4, a flow diagram of a method 700 is illustrated, according to an exemplary embodiment of the present disclosure. Herein, reference of previous figures will be made to describe the method 700. The flow diagram describes the method 700 for applying the sheet material 100 over the objects 'A'. The method 700 starts at 702

Further at 704, the device 1000 is obtained. The device 1000 has been described herein above with reference to FIGS. 1 to 3, and therefore for the sake of brevity, the description of the device 1000 has not been included herein. Further at 706, the sheet material 100 is wrapped around and onto the first end portion 402a of the first shaft member 400a, and is wrapped around and onto the first end portion 404a of the second shaft member 400b, as described above. Furthermore at 708, the device 1000 is moved up to a predetermined height. The predetermined height may vary upon a height of a bed portion, on which the objects 'A' are placed, of the transportation vehicle 'V' from the ground. More specifically, the device 1000 is lifted by the lifting device 500 up to the predetermined height, and moved, alongside of the vehicle, from a rear side to a front side of the transportation vehicle 'V'. Accordingly at 710, a free end of the sheet material 100 is dropped from the first end portion 402a of the first shaft member 400a or from the first end portion 404a of the second shaft member 400b, and the strings 108 may be attached to the rear side of the transportation vehicle 'V'.

Moreover at 712, the device 1000 is moved from the rear side to the front side of the transportation vehicle 'V' for unwrapping the sheet material 100 from the first end portion 402a of the first shaft member 400a for applying the sheet material 100 over the objects 'A' to cover the objects 'A'. Similarly, if required the sheet material 100 from the first end portion 404a of the second shaft member 400b may be unwrapped for applying the sheet material 100 over the objects 'A' to cover the objects 'A. Thereafter, the foldable planer portion 104 is unfolded for completely covering the objects 'A,' as described above. Accordingly, upon covering the objects 'A', the sheet material 100 is tied to the transportation vehicle 'V' with the strings 108 for securing the sheet material 100 on the transportation vehicle 'V'. The method 700 stops at 714.

In one embodiment of the present disclosure, the device 1000 as described above for applying the sheet material 100 is composed of a corrosion resistant material. More particularly, the frame member 200, the shaft members 400 and the locking member 300 are composed of the corrosion resistant material.

The present disclosure provides following advantages in light of a device, such as the device 1000 for applying a sheet material over objects. The device is capable of safely covering the objects placed on transportation vehicles without a need of climbing and moving of workers on and over the transportation vehicles. Furthermore, the device eliminates manual covering of the objects, and provides covering of the objects in a rapid and a convenient manner. Further, a method, such as the method 700 is easy to perform for applying sheet material to the objects.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A device for applying a sheet material over objects, the device comprising:
    a frame member comprising a base, a first sidewall and a second sidewall, wherein each of the first sidewall and the second sidewall extends upwardly from the base in a spaced apart relation with each other;
    at least one shaft member comprising a first end portion and a second end portion opposite to the first end portion, the at least one shaft member rotatably disposed between the first sidewall and the second sidewall such that the first end portion and the second end portion extend outwardly away from the first sidewall and the second sidewall, respectively, wherein the at least one shaft member is capable of being rotated for wrapping the sheet material around and onto the first end portion, and, wherein the at least one shaft member is capable of being rotated for unwrapping the sheet material from the first end portion over the objects; and
    a locking member disposed on the second end portion of each of the at least one shaft member, the locking member is capable of locking and unlocking rotation of the each of the at least one shaft member,
    wherein the locking member comprises a band member adapted to encircle the second end portion of the each of the at least one shaft member, and a lever assembly connected to the band member, the lever assembly capable of being locked at various positions for enabling the band member for locking a rotation of the shaft members during wrapping and unwrapping of the sheet material over the objects.

2. The device of claim 1, wherein the frame member further comprises at least one channel member disposed at the base thereof, the at least one channel member receives a portion of a lifting device for moving the device for wrapping and unwrapping the sheet material from the first end portion of the at least one shaft member over the objects.

3. The device of claim 1, wherein the frame member further comprises at least one supporting member arranged between the first sidewall, the second sidewall and the base for stabilizing the frame member.

4. The device of claim 1, wherein the at least one shaft member further comprises at least one attaching element attached to the first end portion thereof, the at least one attaching element capable of attaching the sheet material to the at least one shaft member for wrapping the sheet material around and onto the first end portion.

5. The device of claim 1 further comprising an auxiliary shaft member rotatably disposed between the first sidewall and the second sidewall such that a first end portion and a second end portion thereof extend outwardly away from the first sidewall and the second sidewall, further, the first end portion having a free end thereof away from the first sidewall, wherein the auxiliary shaft member is capable of being rotated for wrapping an auxiliary sheet material around and onto the first end portion thereof, and wherein the auxiliary shaft member is capable of being rotated for unwrapping the auxiliary sheet material from the first end portion for applying over the objects for covering the objects.

6. The device of claim 5, wherein the auxiliary shaft member further comprises a stopper at the free end of the first end portion thereof for preventing the auxiliary sheet material from slipping out of the auxiliary shaft member.

7. A device for applying a sheet material over objects, the device comprising:
- a frame member comprising a base, a first sidewall and a second sidewall, wherein each of the first sidewall and the second sidewall extends upwardly from the base in a spaced apart relation with each other;
- at least one shaft member comprising a first end portion and a second end portion opposite to the first end portion, the at least one shaft member rotatably disposed between the first sidewall and the second sidewall such that the first end portion and the second end portion extend outwardly away from the first sidewall and the second sidewall, respectively, wherein the at least one shaft member is capable of being rotated for wrapping the sheet material around and onto the first end portion, and, wherein the at least one shaft member is capable of being rotated for unwrapping the sheet material from the first end portion over the objects; and
- a locking member disposed on the second end portion of each of the at least one shaft member, the locking member comprising a band member adapted to encircle the second end portion of the each of the at least one shaft member, and, the locking member further comprising a lever assembly connected to the band member, the lever assembly capable of being locked at various positions for enabling the band member for locking a rotation of the shaft members during wrapping and unwrapping of the sheet material over the objects.

* * * * *

UNITED STATES PATENT AND TRADEMARK OFFICE
CERTIFICATE OF CORRECTION

PATENT NO. : 8,464,974 B2  
APPLICATION NO. : 12/556011  
DATED : June 18, 2013  
INVENTOR(S) : Schillo Page 1 of 1

It is certified that error appears in the above-identified patent and that said Letters Patent is hereby corrected as shown below:

In the Claims:

Column 8; Line 36; Claim 1;   Please delete the word "the".

Column 8; Line 39; Claim 1;   Please delete the second occurrence of the word "the".

Column 10; Line 12; Claim 7;   Please delete the first occurrence of the word "the".

Signed and Sealed this  
Thirteenth Day of August, 2013

Teresa Stanek Rea  
*Acting Director of the United States Patent and Trademark Office*